(12) United States Patent
Yang (10) Patent No.: US 11,580,018 B2
(45) Date of Patent: Feb. 14, 2023

(54) METHOD AND APPARATUS FOR PAGE VALIDITY MANAGEMENT AND RELATED STORAGE SYSTEM

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/239,669

(22) Filed: Apr. 25, 2021

(65) Prior Publication Data

US 2022/0342811 A1   Oct. 27, 2022

(51) Int. Cl.
*G06F 12/02* (2006.01)
*G06F 12/0882* (2016.01)
*G06F 13/16* (2006.01)
*G06F 12/0891* (2016.01)

(52) U.S. Cl.
CPC ...... *G06F 12/0253* (2013.01); *G06F 12/0246* (2013.01); *G06F 12/0882* (2013.01); *G06F 12/0891* (2013.01); *G06F 13/1626* (2013.01); *G06F 13/1673* (2013.01)

(58) Field of Classification Search
None
See application file for complete search history.

(56) References Cited

U.S. PATENT DOCUMENTS

| | | | |
|---|---|---|---|
| 8,782,327 B1 * | 7/2014 | Kang | G06F 12/0246 711/170 |
| 9,645,924 B2 | 5/2017 | Fisher | |
| 10,754,769 B2 | 8/2020 | Bennett | |
| 2014/0101372 A1 * | 4/2014 | Jung | G11C 11/5628 711/103 |
| 2016/0092122 A1 * | 3/2016 | Agrawal | G06F 3/0616 711/103 |
| 2017/0351602 A1 * | 12/2017 | Oshimi | G11C 11/5628 |
| 2018/0307417 A1 | 10/2018 | Dubeyko | |
| 2019/0196966 A1 * | 6/2019 | Hwang | G06F 12/0253 |
| 2020/0379861 A1 * | 12/2020 | Park | G06F 12/0811 |

FOREIGN PATENT DOCUMENTS

| | | |
|---|---|---|
| CN | 110580228 A | 12/2019 |
| CN | 108139968 B | 12/2020 |
| TW | I548989 B | 9/2016 |

* cited by examiner

*Primary Examiner* — Charles J Choi
(74) *Attorney, Agent, or Firm* — Winston Hsu (57) ABSTRACT

A method of performing a garbage collection operation on a source block includes: performing a plurality of partial page clean operations during a series of host write operations. Each partial clean operation includes: performing a validity check process within a partitioned searching range of the source block to obtain valid page information; and performing a page clean process according to the valid page information and a target clean page number to read valid pages indicated by the valid page information.

13 Claims, 7 Drawing Sheets

METHOD AND APPARATUS FOR PAGE VALIDITY MANAGEMENT AND RELATED STORAGE SYSTEM

BACKGROUND OF THE INVENTION

1. Field of the Invention

The present invention relates to flash memory, and more particularly, to method of performing garbage collection operation in flash memory and related controller and storage system.

2. Description of the Prior Art

Recently, storage devices based on NAND flash memory have become widely used for various applications. Compared to conventional hard disk drives, benefits of the NAND flash memory include superior read/write performance, shock-resistance, noiselessness, and lower power consumption.

Due to the property of flash memory, the flash memory does not support overwrite operations. When new data needs to replace older data already stored in the flash memory, the new data will be written to a new location and the data in the old location becomes invalid. Thus, the amount of invalid data will increase as overwriting of older data has been repeated. To ensure enough amount of the storage area in which data can be stored, invalid data in the flash memory needs to be erased. Typically, the flash memory relies on a garbage collection (GC) operation to free up space occupied by the invalid data.

During a GC operation, valid pages (i.e., pages with valid data) of a source block are copied (whose data are read out and written to) to a free destination block, and then the source block is erased for reuse. Typically, the GC operation needs to query address translation tables to determine which pages on the source blocks are valid and whose data needs to be copied to the destination block, which is time-consuming. In order to maintain sufficient storage space in the flash memory, the GC operation also needs to free up a required amount of storage space for accommodating data amount the host attempts to write. As valid pages are not continuously and evenly distributed over the source block, the GC operation may be stuck with searching for valid pages from the source block enough to free up the required amount of storage space, which may lead to significant system latency. In a worst case, this may cause failure of executing host commands before the time limit expires, such that an average system performance is severely deteriorated.

SUMMARY OF THE INVENTION

With this in mind, it is one object of the present invention to provide a method and apparatus of performing a garbage collection operation. Embodiments of the present invention will partition garbage collection operation into multiple partial clean operations, which are interleaved with host write operations. During a single partial clean operation, only a portion of pages of the source block will be checked for validity and data of found valid pages will be read. If the number of found valid pages is lower than expected, the partial clean operation will be ended earlier and the memory controller will not be stuck with the GC operation but start to perform the host write operation. In view of this, the present invention avoids the problem that the host write operations are postponed due to searching for valid pages, which causes the system performance to be deteriorated.

According to one embodiment, a method of performing a garbage collection operation on a source block us provided. The method comprises: performing a plurality of partial page clean operations during a series of host write operations. Each partial clean operation includes: performing a validity check process within a partitioned searching range of the source block to obtain valid page information; and performing a page clean process according to the valid page information and a target clean page number to read valid pages indicated by the valid page information.

According to one embodiment, a controller for use in a flash memory to control operations the flash memory and perform a garbage collection operation on the flash memory is provided. The controller comprises: a storage unit and a processing unit. The storage unit is configured to store information. The processing unit is configured to execute program codes and information stored in the flash memory or in the storage unit so as to perform operations of: performing a plurality of partial page clean operations during a series of host write operations, wherein each partial clean operation comprises: performing a validity check process within a partitioned searching range of the source block to obtain valid page information; and performing a page clean process according to the valid page information and a target clean page number to read valid pages indicated by the valid page information.

According to one embodiment, a storage system is provided. The storage system comprises a flash memory and a controller. The controller is intended for use in controlling operations of the flash memory and perform a garbage collection operation on the flash memory. The controller is configured to: perform a plurality of partial page clean operations during a series of host write operations. Each partial clean operation comprises: performing a validity check process within a partitioned searching range of the source block to obtain valid page information; and performing a page clean process according to the valid page information and a target clean page number to read valid pages indicated by the valid page information.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Overview

Figure 1:
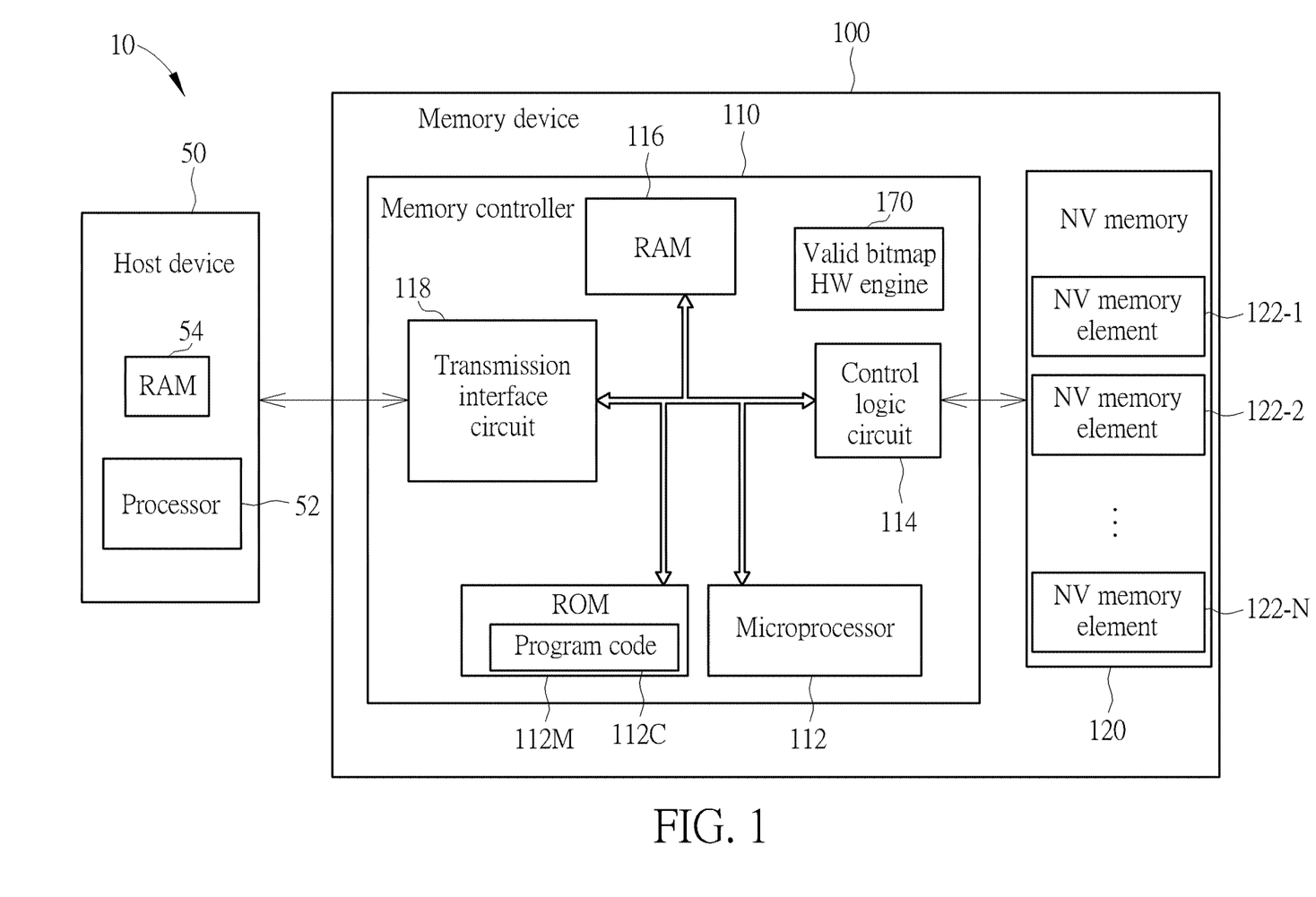
FIG. 1 illustrates a block diagram of a memory device according to one embodiment of the present invention.

FIG. 1 is a diagram illustrating an electronic device 10 according to an embodiment of the present invention, where the electronic device 10 comprises a host device 50 and a memory device 100. The host device 50 may comprise: a RAM 54 and at least one processor 52 configured to control operations of the host device 50. Examples of the host device 50 may include, but are not limited to: a smartphone, a tablet computer, a wearable device, a personal computer such as a desktop computer and a laptop computer, an imaging device such as a digital still camera or a video camera a game console, a car navigation system, a printer, a scanner or a server system. Examples of the memory device 100 may include, but are not limited to: a portable memory device (such as a memory card conforming to SD/MMC, CF, MS, XD or UFS specifications), a solid state drive (SSD) and various embedded storage device (such as an embedded storage device conforming to UFS or EMMC specifications).

According to various embodiments, the memory device 100 may comprise a controller such as a memory controller 110, and may further comprise a non-volatile (NV) memory 120. The NV memory 120 is configured to store information. The NV memory 120 may comprise at least one NV memory element (e.g. one or more NV memory elements), such as a plurality of NV memory elements 122_1-122_N. For example, the NV memory 120 may be a flash memory, and the NV memory elements 122_1-122_N may be a plurality of flash memory chips or a plurality of flash memory dies, respectively, but the present invention is not limited thereto. In addition, the NV memory 120 may comprise memory cells having a two-dimensional structure or may comprise memory cells having a three-dimensional structure.

As shown in FIG. 1, the memory controller 110 may comprise a processing circuit such as a microprocessor 112, a storage component such as a read-only memory (ROM) 112M, a control logic circuit 114, a volatile memory 116 and a transmission interface circuit 118 and an optional valid bitmap hardware engine 170, where at least one portion (e.g. a portion or all) of these components may be coupled to one another through a bus. The volatile memory 116 is implemented by a random access memory (RAM), for example, the volatile memory 116 may be a static RAM (SRAM). The volatile memory 116 may be configured to provide internal storage space to the memory controller 110, for example, temporarily storing information. In addition, the ROM 112M of this embodiment is configured to store a program code 112C, and the microprocessor 112 is configured to execute the program code 112C to control access of the NV memory 120. Alternatively, the program code 112C may be stored in the NV memory 120.

The memory controller 110 controls reading, writing and erasing of the NV memory 120 through a control logic circuit 114. In addition, the memory controller 110 could perform writing of user data based on host commands from the host device 50 and writing of valid data which is read from the NV memory 120 by the garbage collection and or wear-leveling concurrently. The control logic circuit 114 may be further configured to control the NV memory 120 and comprise an Error Correction Code (ECC) circuit (not shown), to perform data protection and/or error correction, but the present invention is not limited thereto. The transmission interface circuit 118 may conform to a specific communications specification (such as Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification) and may perform communications with the host device 50 according to the specific communications specification.

Typically, the host device 50 may access the memory device 100, indirectly, through transmitting host commands and corresponding logic addresses to the memory controller 110. The memory controller 110 receives the host commands and the logic addresses, and translates the host commands to memory operation commands, and further controls the NV memory 120 with the memory operation commands to perform read, write or erase operations upon memory units or data pages having physical addresses within the NV memory 120, where the physical addresses corresponds to the logic addresses. When the memory controller 110 performs an erase operation on any NV memory element 122_k within the plurality of NV memory elements 122_1-122_N, at least one block of the NV memory element 122_k may be erased. In addition, each block of the NV memory element 122_k may comprise multiple pages, and an access operation (e.g. read or write) may be performed on one or more pages.

In the present invention, a garbage collection (GC) operation may be implemented with multiple partial clean operations driven by the memory controller 110 and these partial clean operations may be distributed to different time slots. The partial clean operations may interleave with a series of read or write operations based on host commands sent from the host device 50. During a single partial clean operation, the memory controller 110 may identify valid pages within a portion of a source block and read out data on the identified valid pages. After several partial clean operations are performed and data on all the valid pages of the source block are copied to a new destination block, the source block can be erased and reused. Accordingly, the GC operation is finished.

Figure 2:
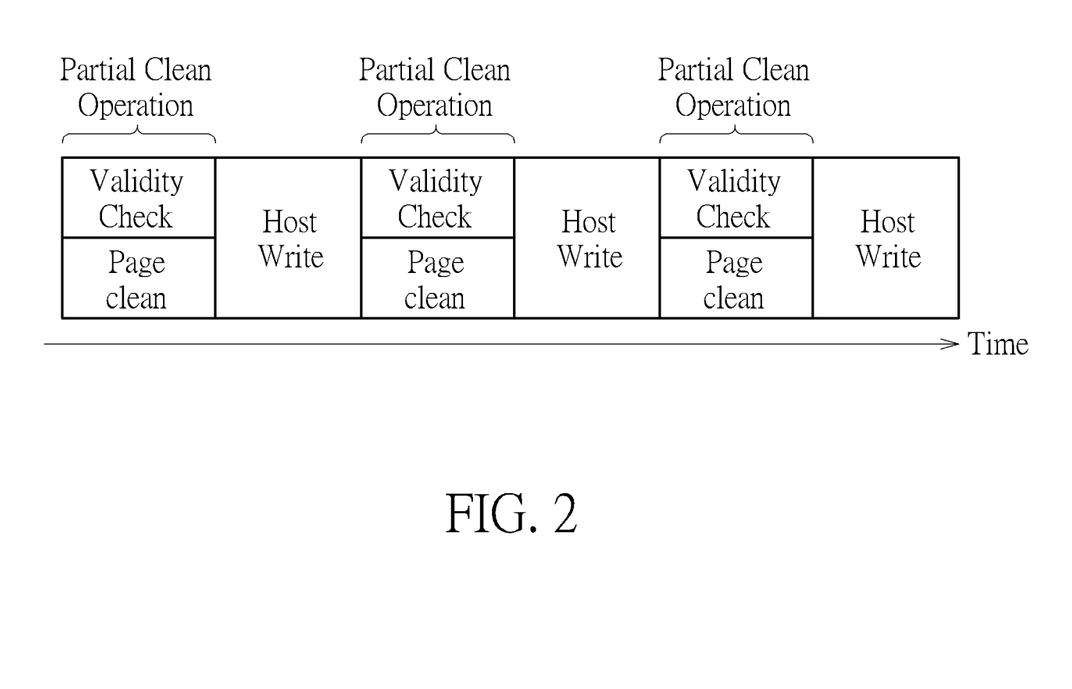
FIG. 2 illustrates how a garbage collection operation is performed according to one embodiment of the present invention.

FIG. 2 illustrates how the GC operation is performed according to one embodiment of the present invention. As illustrated, each partial clean operation includes two sub-processes, one of which is validity check process, while the other is page clean process. During the validity check process, validity of each page within a partitioned searching range ScanP of the source block will be checked, thereby to build valid page information regarding the partitioned searching range ScanP, where the valid page information indicates which pages are valid. During the validity check process, the memory controller 110 will query a host-to-flash (H2F) address translation table and a flash-to-host (F2H) address translation table to confirm which page is valid. Specifically, the memory controller 110 firstly loads a portion of the F2H address translation table associated with the partition searching range ScanP of the source block, to the RAM 54 of the host device 50 or the RAM 116 of the memory controller 110. Based on the loaded portion of the F2H address translation table, the memory controller 110 obtains what logical address a page to be checked is mapped to. Accordingly, the memory controller 110 queries the H2F address translation table to translate the logical address to which the page to be checked is mapped into a physical address. If the physical address belongs to the page to be checked, it is confirmed that this page is valid. If not, it means the logical address is further mapped to another page and the page is invalid.

The valid page information obtained by the validity check processes may be recorded into a valid bitmap table stored in the RAM 54 of the host device 50 or the RAM 116 of the memory controller 110, which uses one bit to identify the validity of each page. Alternatively, valid page information may be recorded into a FIFO buffer allocated from the RAM 54 or the RAM 116, entries of the FIFO buffer records addresses of the valid pages. Validity of all pages of the source block will be determined by performing validity check processes with respect to multiple continuous partitioned searching ranges ScanP of the source block. For example, assuming that a source block consists of 10000 pages, each partitioned searching range ScanP may define 400 continuous pages of the source block. After 25 validity check processes are performed, validity of all pages on the source block can be confirmed.

Once the validity check process is done (i.e., validity of all pages within the partitioned searching range ScanP has been checked), the page clean process starts. During the page clean process, data of valid pages that are indicated by the valid page information will be read out. The memory controller 110 reads out the valid pages that have been found and confirmed during the validity check process. According to various embodiments of the present invention, the page clean process may end when data of valid pages have been read out. Alternatively, the page clean process may end when data of valid pages have been programmed to pages of a new destination block.

The memory controller 110 relies on a pointer SearchPtr to track the progress of valid checking. The pointer SearchPtr points to an address of a page whose validity is currently being checked. Once the valid check process is ended, the pointer SearchPtr store an address of a last page whose validity is checked by the ended validity checking process. The pointer SearchPtr will be later used to point to an address of a first page whose validity is about to be checked by a new validity checking process. In addition, the memory controller 110 relies on a pointer CleanPtr to track the progress of page cleaning. The pointer CleanPtr points to an address of a valid page whose data is currently being read. Once the page clean process is ended, the pointer CleanPtr store an address of a last valid page whose data is read out by the ended page clean process. The pointer CleanPtr will be later used to point to an address of a first page whose data is about to be read out by a new page clean process.

To initialize the GC operation, the memory controller 110 needs to determine a host-to-GC write ratio firstly. The host-to-GC write ratio indicates a ratio of a write amount of user data based on host commands sent from the host device 50 to a write amount of valid data based on the GC operation during a certain period. The host-to-GC write ratio reflects how much valid data needs to be moved by the GC operation (i.e., freeing up the storage space in the NV memory 120) to balance the writing of host commands (which occupies the storage space in the NV memory 120), in order to maintain a minimum number of free blocks in the NV memory 120. According to the host-to-GC write ratio, the memory controller 110 could determine a target clean page number C, which indicates how many valid pages needs to be copied during the page clean process of each partial clean operation, in order to satisfy the host-to-GC write ratio. Assuming that a total valid page number of a source block is SrcVP and a total page number of the source block is BlkP, a number of partial clean operations that is required by reading out all the valid pages of the source block will be: (SrcVP/C). Accordingly, a partitioned searching range ScanP of the validity check process during each partial clean operation will be: BlkP/(ScrVP/C), wherein the partitioned searching range ScanP indicates how many pages of the source block whose validity needs to be checked during a single validity check process.

As valid pages are not continuously and evenly distributed over the source block, the memory controller 110 may fail to find as many valid page as required by the target clean page number C during a single validity check process. For example, the number of valid pages within the current partitioned searching range ScanP is lower than expected, which leads to no or few numbers of valid pages can be read by the page clean process. Therefore, an actual clean page number CleanVP, which indicates how many valid pages whose data are actually read during each page clean process will be pretty different. Depending on the distribution of valid pages over the source block, the actual clean page number CleanVP may be smaller than the target clean page number C. Under such condition, the page clean process will be ended once the pointer CleanPtr is identical to the pointer SearchPtr. This is because all the found and confirmed valid pages have been read by the page clean process. Therefore, it is expected that a following page clean process can read more valid pages. In view of this, a number of valid pages that is required to be read by the following page clean process will be (RemainVP+C), where "RemainVP" is a remaining clean page number, which indicates how many of the target clean page numbers have not been read so far. The remaining clean page number RemainVP will be accumulated if the actual clean page number CleanVP remain lower than the target clean page number C. For example, if the target clean page number C is 30 pages per page clean process and the validity check process of a first partial clean operation only confirms 14 valid pages within its corresponding partitioned searching range ScanP, this means the page clean process of the first partial clean operation can only read 14 valid pages. Thus, the remaining clean page number RemainVP after the first partial clean operation will be 16 pages (i.e., 30-14). In view of this, the page clean process of a second partial clean operation is required to read 46 pages (i.e., RemainVP(16)+C(30)). However, if the validity check page process of the second partial clean operation only confirms 13 valid pages within its corresponding partitioned searching range ScanP, this means the page clean process of the second partial clean operation can only read 13 valid pages. Thus, the remaining clean page number RemainVP after the second partial clean operation will be 63 pages (i.e., RemainVP(46)+C (30)−CleanVP (13)). In view of this, the page clean process of a third partial clean operation is required to read 93 pages (i.e., 63+30). From the above descriptions, the remaining clean page number RemainVP will be updated by: (RemainVP+C)−CleanVP after a partial clean operation is finished. On the other hand, if the valid pages are concentrated within the current partitioned searching range ScanP, the memory controller 110 may be able to find as many valid page as the summation of the target clean page number C and the remaining clean page number RemainVP. Under such condition, the page clean process will be ended once the number of valid pages read by the memory controller 110 reaches: (RemainVP+C).

Figure 3:
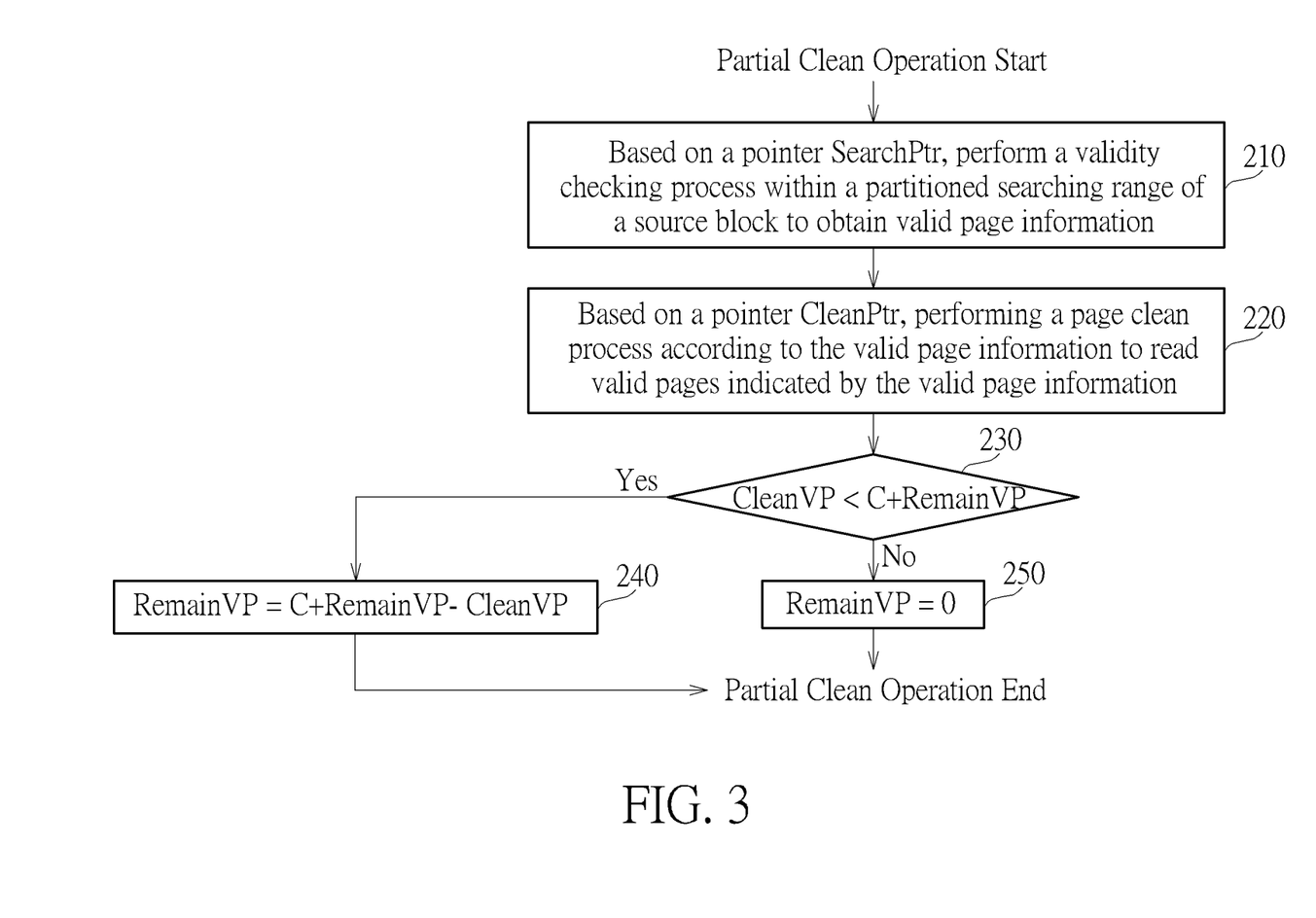
FIG. 3 illustrates a flow of a single partial page clean operation according to one embodiment of the present invention.

Please refer to FIG. 3, which illustrates a flow of performing a single partial page clean operation according to one embodiment of the present invention. As illustrated, the flow includes following steps:

Step 210: Based on a pointer SearchPtr, perform a validity checking process within a partitioned searching range of a source block to obtain valid page information;

Step 220: Based on a pointer CleanPtr, performing a page clean process according to the valid page information to read valid pages indicated by the valid page information.

Step 230: Determine whether an actual clean page number CleanVP is lower than a summation of a target clean page number and a remaining clean page number RemainVP.

Step 240: Set the remaining clean page number RemainVP as:

$C+RemainVP-CleanVP.$

Step 250: Set the remaining clean page number RemainVP as 0.

At step 210, a validity checking process is performed within a partitioned searching range ScanP of a source block to obtain valid page information. As mentioned above, the partitioned searching range ScanP of the source block is determined according to a target clean page number C, a total valid page number SrcVP and a total page number BlkP of the source block. At step 220, a page clean process is performed according to the valid page information obtained in the validity check process. The page clean process will be ended if the memory controller 110 read as many valid pages as the summation of the remaining clean page number RemainVP and the target clean page number, i.e., (C+RemainVP) pages. Alternatively, the page clean process will be ended when the pointer CleanPtr catches up with the pointer, SearchPtr, which means the confirmed valid pages may not be sufficient. After the page clean process is finished, the flow goes to step 230. At step 230, it is checked whether an actual clean page number CleanVP (i.e., the number of valid pages that are actually read by the memory controller 110) is smaller than (C+RemainVP) pages. If yes, this means the confirmed valid pages are not sufficient and the memory controller 110 will attempt to read more valid pages in a following page clean operation. Accordingly, the flow goes to step 240, the remaining clean page number will be set as C+RemainVP−CleanVP. If the check result of step 230 is no, this means the confirmed valid pages during the valid check process are sufficient for the memory controller 110 to read, such that the host-to-GC ratio can be satisfied. Accordingly, the flow goes to step 250, the remaining clean page number RemainVP will be set as 0.

Figure 4:
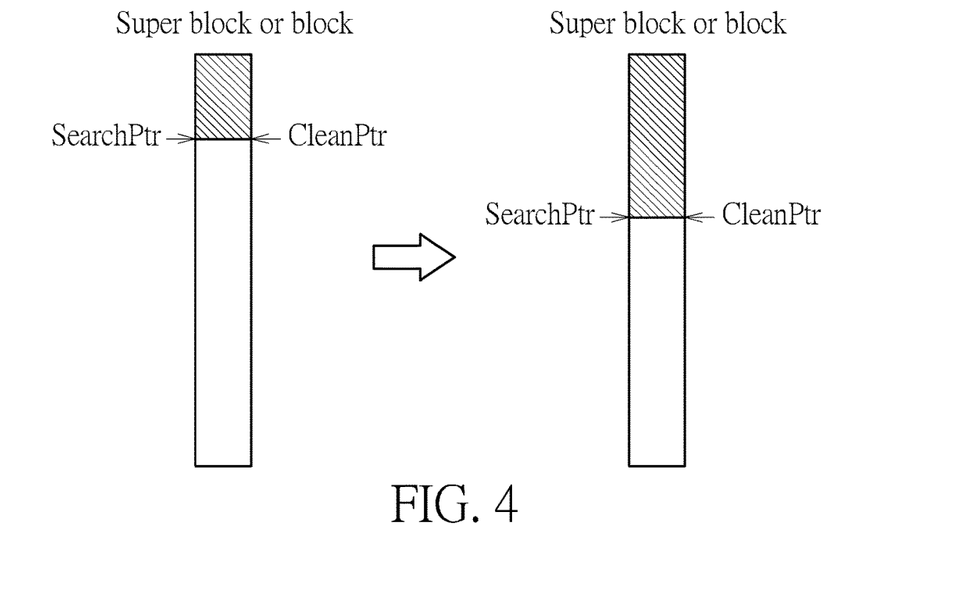
FIGS. 4-6 illustrate relationships between processes of the validity check process and the page clean process according to different distributions of valid pages.
Figure 5:
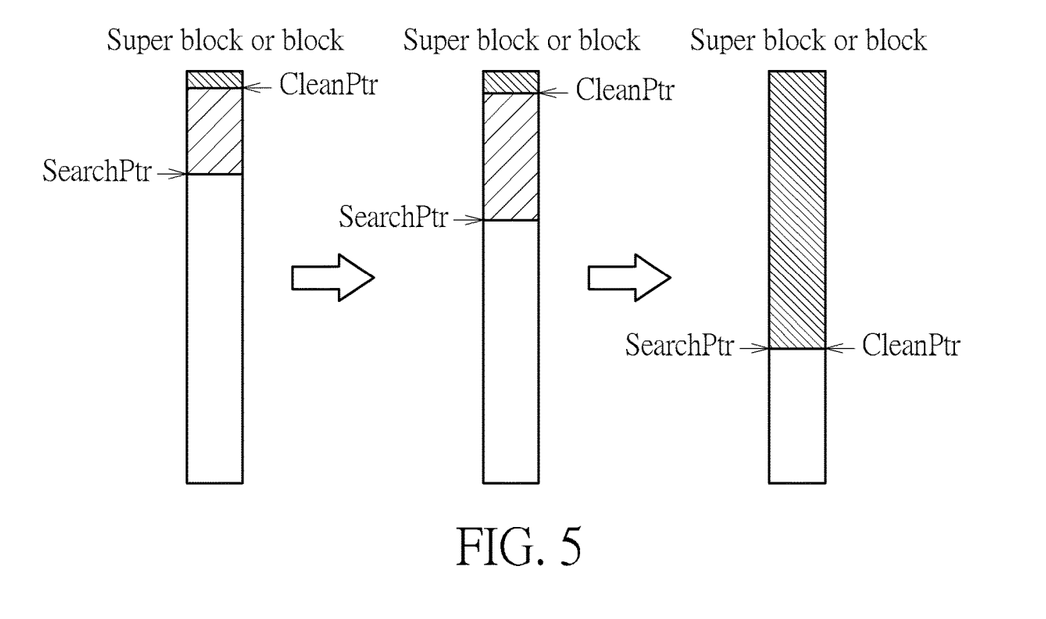
Figure 6:
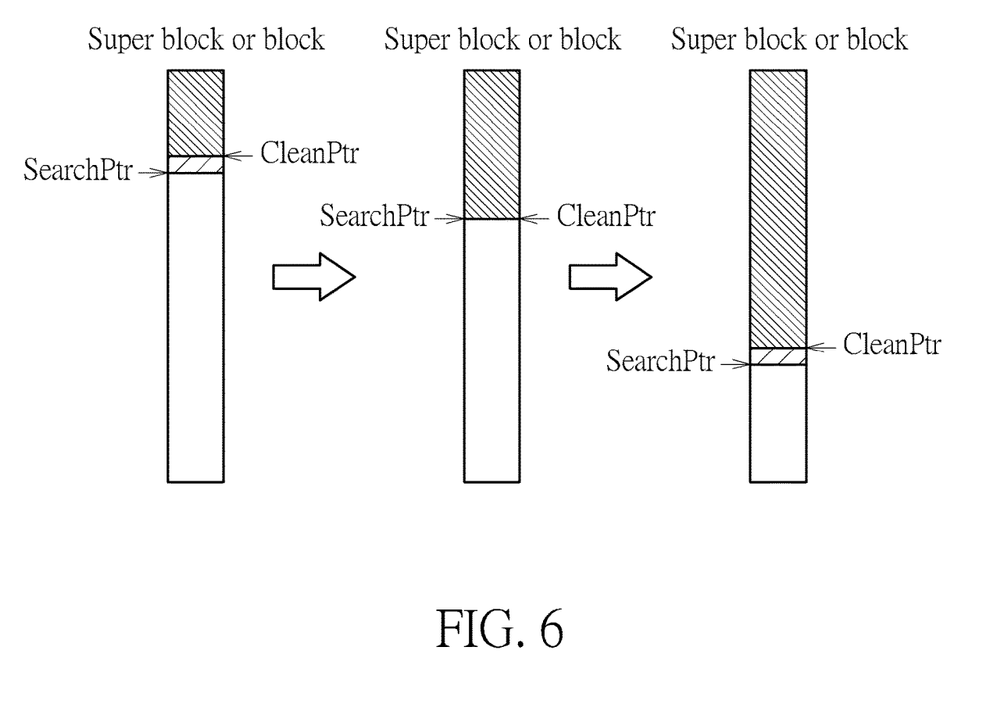

FIGS. 4-6 illustrate relationships between processes of the validity check process and the page clean process according to different distributions of valid pages. In a first situation illustrated by FIG. 4, it is assumed that valid pages are mostly distributed at the end of a source block (or a source super block). In view of this, the page clean process of each partial clean operation cannot read sufficient valid pages (i.e., the actual clean page number CleanVP remain lower than the target clean page number C) at the very beginning. Thus, the pointer CleanPtr is quite close to the pointer SearchPtr most of the time. Accordingly, the remaining clean page number RemainVP will continuously increase.

Ina second situation illustrated by FIG. 5, it is assumed that valid pages are mostly distributed at a beginning of a source block. In view of this, the page clean process of each partial clean operation cannot read all the confirmed valid pages within the partitioned searching range ScanP (i.e., the number of found valid pages within the partitioned searching range ScanP is significantly higher than RemainVP+C). Subsequently, the pointer CleanPtr will lag behind the pointer SearchPtr at the very beginning. Once the page clean process moves toward the range of the source block that does not include any valid pages or includes few valid pages, the pointer CleanPtr will gradually catch up with the pointer SearchPtr. After the CleanPtr catches up with the pointer SearchPtr, the remaining clean page number RemainVP starts to increase.

In a third situation illustrated by FIG. 6, it is assumed that valid pages are evenly distributed over the source block. In view of this, the pointer CleanPtr may lag behind or catch up with the pointer SearchPtr. When the pointer CleanPtr lags behind the pointer SearchPtr, the remaining clean page number RemainVP gradually increases. When the pointer CleanPtr may catch up with the pointer SearchPtr, the remaining clean page number RemainVP gradually decreases to zero.

Figure 7:
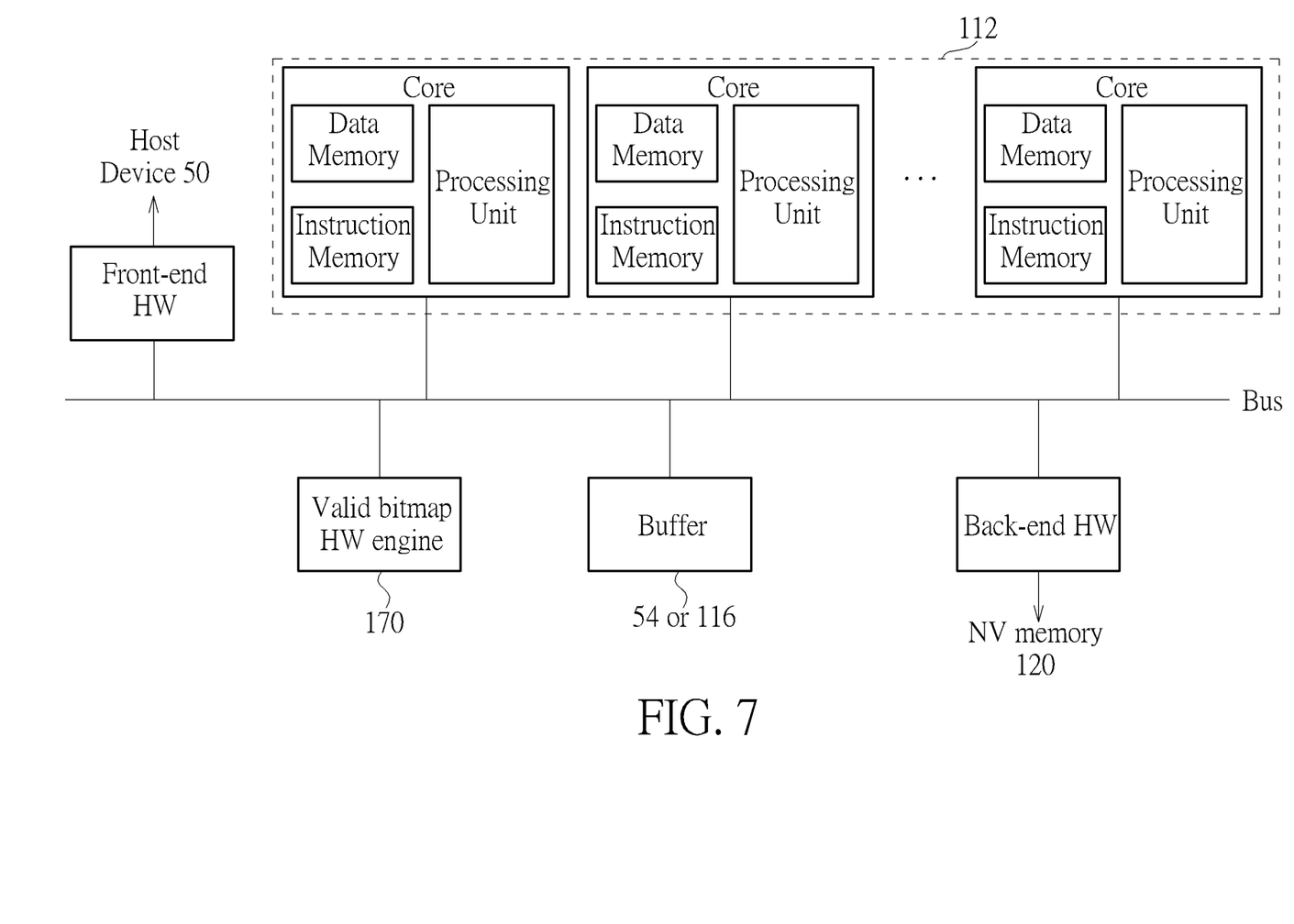
FIG. 7 illustrates architecture of possible implementation of the validity check process according to embodiments of the present invention.

FIG. 7 illustrates architecture of implementation of the validity check process according to embodiments of the present invention. In one embodiment, the microprocessor 112 may be implemented on a multi-core processor 112, which includes multiple processor cores. Each processor core may comprise a data memory to store global or local variables, an instruction memory to store program codes, and a processing unit. During operation, the microprocessor 112 may assign one or more processor cores to run flash translation layer (FTL) threads to conduct operations regarding address mapping, garbage collection, and wear-leveling. For example, the above-mentioned partial clean operation may be performed on one or more processor cores. Alternatively, it is possible to run a thread regarding the valid check process on one processor core, while running a thread regarding the page clean process on another processor core. In some embodiments, the memory controller 110 may further include dedicated hardware, i.e., a valid bitmap hardware engine 170, to perform the valid check process. The valid bitmap hardware engine 170 may be operable to check validity of pages within the partitioned searching range by querying F2H and H2F address translation tables and store valid page information in the buffer as set forth above.

Figure 8:
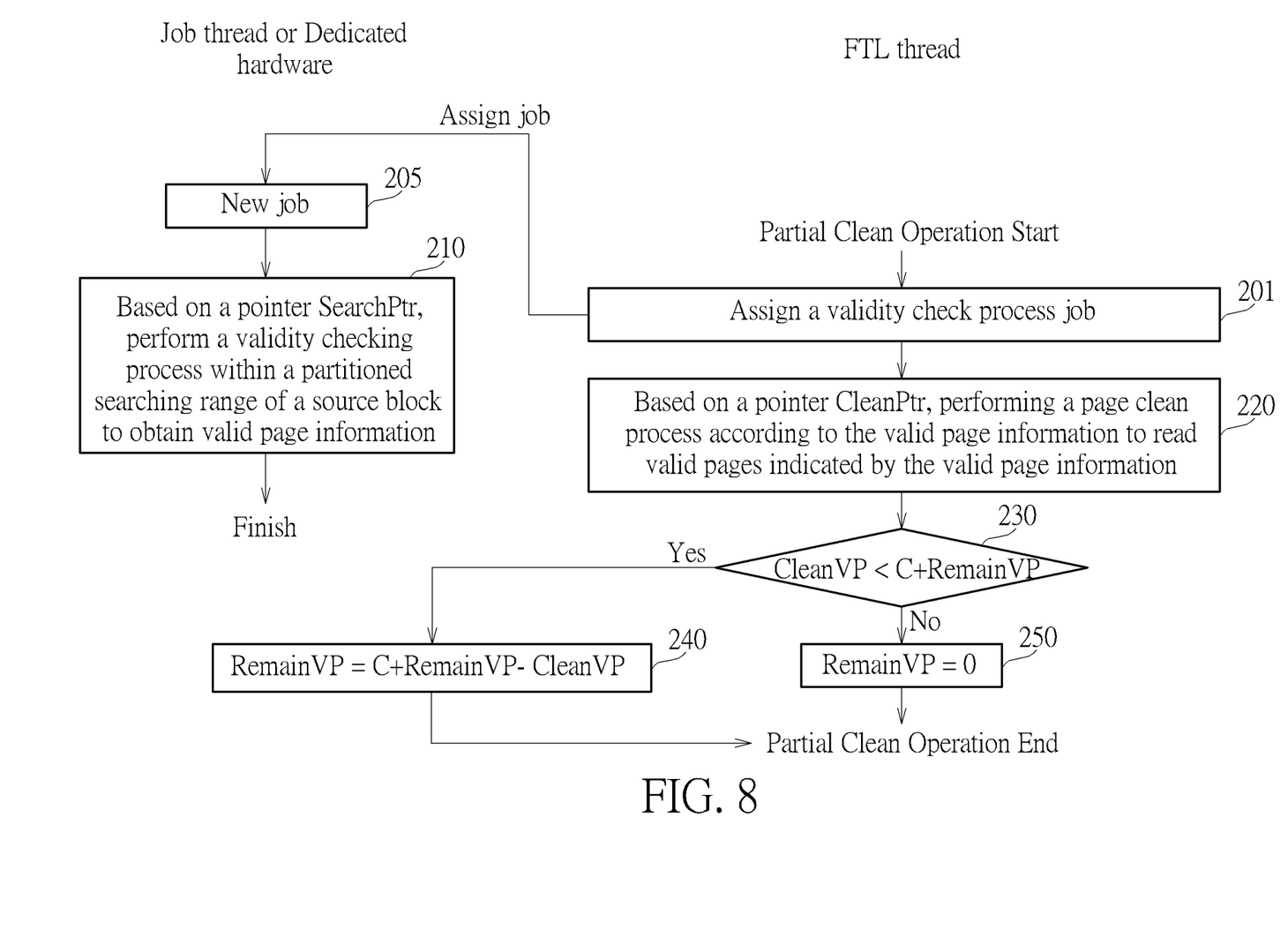
FIG. 8 illustrates a flow of a single partial clean operation according to another embodiment of the present invention.

FIG. 8 illustrates a flow of performing a partial clean operation according to another embodiment of the present invention. As illustrated, a FTL thread running on a processor core of the microprocessor 112 may initiate a partial clean operation. At step 201, the FTL thread may assign a validity check process job to another processor core inside the microprocessor 112 or to the valid bitmap hardware engine 170 thereby to perform validity checking page by page.

In the above embodiments, the partial clean operation and corresponding page validity process as well as page clean process are described to be applied to pages and blocks of the NV memory 120. However, according to various embodiments of the present invention, it is also possible to apply the partial clean operation and corresponding page validity process as well as page clean process to super pages and super blocks of the NV memory 120, where a super page may consist of several pages on different NV memory elements 122_1-122_N, while a super block may consist of several blocks on different NV memory elements 122_1-122_N. In addition, the memory controller 110 is operable to simultaneously perform multiple partial clean operations on different NV memory elements 122_1-122_N.

Accordingly, the validity check processes and the page clean processes on different NV memory elements 122_1-122_N can have different progresses, respectively.

In summary, the present invention provides a method of performing the GC operation. Embodiments of the present invention perform the GC operations in terms of multiple partial clean operations. These partial clean operations interleave with host write operations. During each partial clean operation, a validity check process is performed to check validity of a portion of pages of a source block and a page clean process is performed to read data of valid pages found and confirmed during the validity check process. In addition, the progress of the page clean operation is allowed to be different from the progress of the validity check process. If the number of found and confirmed valid pages are lower than expected (i.e., the number of valid pages is lower than (RemainVP+C)), the page clean operation will be ended and the memory controller will not be stuck with the GC operation but start to perform the host write operation. Accordingly, it is expected that the validity check process can find more valid pages during a next partitioned searching range, thereby to remedy lack of the valid pages. In view of this, the present invention avoids the problem that host write operations are postponed due to searching for valid pages, which causes the system performance to be deteriorated.

Embodiments in accordance with the present invention can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing a garbage collection operation with respect to a source block in multiple phases, comprising:
    performing a plurality of partial page clean operations during a series of host write operations, wherein each partial clean operation is performed in one of multiple phases, and comprises:
        performing a validity check process within a partitioned searching range of the source block to check validity of all pages in within the partitioned searching range and accordingly generate valid page information based on found valid pages, wherein a full range of addresses of pages in the source block are partitioned into a plurality of partitioned searching ranges, comprising:
            ending the validity check process if validity of all the pages in the partitioned searching range has been checked, wherein the partitioned searching range defines a predetermined range of continuous pages that need to be checked in each phase; and
        performing a page clean process according to the valid page information and a target clean page number to read valid pages indicated by the valid page information, comprising:
            if a number of the valid pages found within the partitioned searching range is smaller than a summation of the target clean page number and a remaining clean page number, ending the page clean process after all the valid pages within the partitioned searching range have been read, wherein the target clean page number is a number of pages whose data are expected to be read out in each phase, and the remaining clean page number is a cumulative number of pages whose data have not been read in a current phase; and
            updating the remaining clean page number according to the remaining clean page number, the target clean page number and the number of the valid pages that have been read during the ended page clean process.

2. The method of claim 1, further comprising:
    determining a host-to-GC ratio which is a ratio of a write amount of user data based on host commands to a write amount of valid data based on the GC operation;
    determining the target clean page number according to the host-to-GC ratio; and
    determining the partitioned searching range according to the target clean page number, a total page number of the source block, and a total valid page number of the source block.

3. The method of claim 1, wherein the step of performing the validity check process comprises:
    recording validity of each page within the partitioned searching range into a valid bitmap table.

4. The method of claim 1, wherein the step of performing the validity check process comprises:
recording addresses of each valid page within the partitioned searching range into a FIFO buffer.

5. The method of claim 1, wherein the step of performing the page clean process comprises:
ending the page clean process if a number of valid pages that have been read during the page clean process is identical to a summation of the target clean page number and a remaining clean page number.

6. The method of claim 5, further comprising:
after the page clean process ended, updating the remaining clean page number as zero.

7. A controller for use in a flash memory to control operations of the flash memory and manage a garbage collection operation with respect to a source block of the flash memory that is performed in multiple phases, comprising:
a storage unit, configured to store information; and
a processing unit, configured to execute program codes and information stored in the flash memory or in the storage unit so as to perform operations of:
performing a plurality of partial page clean operations during a series of host write operations, wherein each partial clean operation is performed in one of the multiple phases, and comprises:
performing a validity check process within a partitioned searching range of the source block to check validity of all pages in within the partitioned searching range and accordingly generate valid page information based on found valid pages, wherein a full range of addresses of pages in the source block are partitioned into a plurality of partitioned searching ranges, comprising:
ending the validity check process if validity of all the pages in the partitioned searching range has been checked, wherein the partitioned searching range defines a predetermined range of continuous pages that need to be checked in each phase; and
performing a page clean process according to the valid page information and a target clean page number to read valid pages indicated by the valid page information, comprising:
if a number of the valid pages found within the partitioned searching range is smaller than a summation of the target clean page number and a remaining clean page number, ending the page clean process after all the valid pages within the partitioned searching range have been read, wherein the target clean page number is a number of pages whose data are expected to be read out in each phase, and the remaining clean page number is a cumulative number of pages whose data have not been read in a current phase; and
updating the remaining clean page number according to the remaining clean page number, the target clean page number and the number of the valid pages that have been read during the ended page clean process.

8. The controller of claim 7, wherein the controller is configured to execute the program codes to perform operations of:
determining a host-to-GC ratio which is a ratio of a write amount of user data based on host commands to a write amount of valid data based on the GC operation;
determining the target clean page number according to the host-to-GC ratio; and
determining the partitioned searching range according to the target clean page number, a total page number of the source block, and a total valid page number of the source block.

9. The controller of claim 7, wherein the controller is configured to execute the program codes to perform operations of:
recording validity of each page within the partitioned searching range into a valid bitmap table.

10. The controller of claim 7, wherein the controller is configured to execute the program codes to perform operations of:
recording addresses of each valid page within the partitioned searching range into a FIFO buffer.

11. The controller of claim 7, wherein the controller is configured to execute the program codes to perform operations of:
ending the page clean process if a number of valid pages that have been read during the page clean process is identical to a summation of the target clean page number and a remaining clean page number.

12. The controller of claim 11, wherein the controller is configured to execute the program codes to perform operations of:
after the page clean process ended, updating the remaining clean page number as zero.

13. A storage system, comprising:
a flash memory; and
a controller for controlling operations of the flash memory and performing a garbage collection operation with respect to a source block of the flash memory that is performed in multiple phases, the controller configured to:
performing a plurality of partial page clean operations during a series of host write operations, wherein each partial clean operation is performed in one of the multiple phases, and comprises:
performing a validity check process within a partitioned searching range of the source block to check validity of all pages in within the partitioned searching range and accordingly generate valid page information based on found valid pages, wherein a full range of addresses of pages in the source block are partitioned into a plurality of partitioned searching ranges, comprising:
ending the validity check process if validity of all the pages in the partitioned searching range has been checked, wherein the partitioned searching range defines a predetermined range of continuous pages that need to be checked in each phase; and
performing a page clean process according to the valid page information and a target clean page number to read valid pages indicated by the valid page information, comprising:
if a number of the valid pages found within the partitioned searching range is smaller than a summation of the target clean page number and a remaining clean page number, ending the page clean process after all the valid pages within the partitioned searching range have been read, wherein the target clean page number is a number of pages whose data are expected to be read out in each phase and the remaining clean page number is a cumulative number of pages whose data have not been read in a current phase; and updating the remaining clean page number according to the remaining clean page number, the target clean page number and the number of the valid pages that have been read during the ended page clean process.

\* \* \* \* \*